United States Patent
Kondrasovs et al.

(10) Patent No.: US 9,268,040 B2
(45) Date of Patent: Feb. 23, 2016

(54) METHOD FOR PROCESSING A SIGNAL FROM A PHOSWICH SCINTILLATOR, AND ASSOCIATED SCINTILLATION DETECTOR

(71) Applicant: COMMISSARIAT A L'ENERGIE ATOMIQUE ET AUX ENE ALT, Paris (FR)

(72) Inventors: Vladimir Kondrasovs, Palaiseau (FR); Stephane Normand, Isigny le Buat (FR); Karim Boudergui, Nogent-le-Phaye (FR); Matthieu Hamel, Cherbourg Octeville (FR); Chrystele Pittance, Maurepas (FR); Licinio Rocha, Nanterre (FR); Mathieu Trocme, Paris (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 55 days.

(21) Appl. No.: 14/358,378

(22) PCT Filed: Nov. 23, 2012

(86) PCT No.: PCT/EP2012/073531
§ 371 (c)(1),
(2) Date: May 15, 2014

(87) PCT Pub. No.: WO2013/076279
PCT Pub. Date: May 30, 2013

(65) Prior Publication Data
US 2014/0312236 A1     Oct. 23, 2014

(30) Foreign Application Priority Data
Nov. 25, 2011 (FR) ..................... 11 60804

(51) Int. Cl.
G01T 1/20 (2006.01)
G01T 1/202 (2006.01)
G01T 1/17 (2006.01)

(52) U.S. Cl.
CPC ............. *G01T 1/2008* (2013.01); *G01T 1/17* (2013.01)

(58) Field of Classification Search
CPC ................................. G01T 1/20; G01T 1/202
See application file for complete search history.

(56) References Cited

U.S. PATENT DOCUMENTS

| | | |
|---|---|---|
| 5,399,869 A | 3/1995 | Usuda |
| 5,514,870 A | 5/1996 | Langenbrunner |

(Continued)

OTHER PUBLICATIONS

Yousefi, et al. "A wavelet-based pulse shape discrimination method for simultaneous beta and gamma spectroscopy", Nuclear Instruments and Methods in Physics Research A, vol. 599, No. 1, pp. 66-73, XP025950409, (Feb. 2009).

Takada, et al. "Characteristics of a phoswich detector to measure the neutron spectrum in a mixed filed of neutrons and charged particles", Nuclear Instruments and Methods in Physics Research A, vol. 476, No. 1-2, pp. 332-336, XP027303235, (Jan. 2002).

(Continued)

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

A method for processing electrical signals from a phoswich scintillator including an upstream scintillator and a downstream scintillator, the method including, for each electrical signal: digitization of the electrical signal; determination of an amplitude and an integral surface area of the digitized electrical signal; and representation of an event associated with an electrical signal by a pair of data items.

32 Claims, 6 Drawing Sheets

(56) References Cited

U.S. PATENT DOCUMENTS

| 7,964,848 B2* | 6/2011 | Hamby | G01T 1/023 250/362 |
|---|---|---|---|
| 8,894,881 B2 | 11/2014 | Hamel et al. | |
| 2009/0039271 A1 | 2/2009 | Farsoni et al. | |
| 2012/0166120 A1 | 6/2012 | Corre et al. | |
| 2012/0318998 A1 | 12/2012 | Kondrasovs et al. | |
| 2013/0299742 A1 | 11/2013 | Hamel et al. | |

OTHER PUBLICATIONS

International Search Report Issued Feb. 8, 2013 in PCT/EP12/073531 Filed Nov. 23, 2012.
French Search Report Issued Jul. 2, 2012 in FR1160804 Filed Nov. 25, 2011.

* cited by examiner

METHOD FOR PROCESSING A SIGNAL FROM A PHOSWICH SCINTILLATOR, AND ASSOCIATED SCINTILLATION DETECTOR

FIELD OF THE INVENTION AND PRIOR ART

The invention relates to a method for processing a signal from a sandwich scintillator more commonly referred to as a phoswich scintillator (the term "phoswich" being a contraction of "phosphor sandwich"). The invention also relates to a scintillation detector comprising a phoswich scintillator and a processing circuit suitable for implementing a method for processing a signal according to the invention.

Scintillation detectors are used in measurement systems for ionising radiation detection. They make it possible to detect the presence of radioactive sources on the surface of or inside objects or people. They are intended to identify quantitatively the nature of the radiation detected (β particles, internal conversion electrons, γ photons, X photons, bremsstrahlung photons, etc.). For this purpose, they comprise means suitable for distinguishing between the particles detected.

Among scintillation detectors, scintillation detectors comprising a "phoswich" scintillator are chosen for the different scintillation properties thereof, generally the decay time. The light signal emitted by a phoswich detector following the detection of an ionising particle is characteristic of the detector. A shape analysis of the total light signal collected then makes it possible to locate the region, or regions, of interaction. This is generally made use of in two ways:

- in the field of radioprotection and low-energy dosimetry (each scintillator is then optimised in thickness and composition so as only to detect one type of particle, thus enabling the discrimination thereof), and
- in the field of fundamental research (when the incident particle is an ion, a telescope type assembly is then suitable for distinguishing between two incident ions isotopically).

Figure 1:
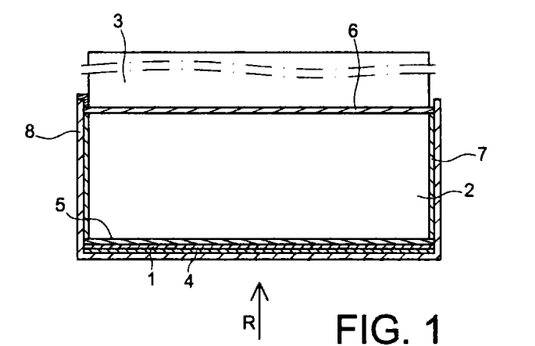
FIG. 1 represents a cross-sectional view of a phoswich scintillator according to the prior art equipped with a photomultiplier.

FIG. 1 represents a cross-sectional view of a "phoswich" scintillator according to the prior art equipped with a photomultiplier as described in the U.S. Pat. No. 5,514,870.

The "phoswich" scintillator comprises a thin plastic scintillator 1 and a thick scintillator crystal 2. The plastic scintillator 1 and the scintillator crystal 2 are attached to each other using an optical cement 5 and inserted into a casing 8. A photomultiplier 3 is attached to the scintillator crystal 2 using an optical cement 6. A thin metal layer 4 covers the face of the plastic scintillator 1 whereon the radiation R to be detected is incident. Hereinafter in the description, the plastic scintillator 1 whereon the radiation R is incident will also be referred to as the "upstream scintillator" and the scintillator crystal 2 as the "downstream scintillator". The side walls of the scintillator crystal 2 are coated with a light reflector 7.

Figure 2:
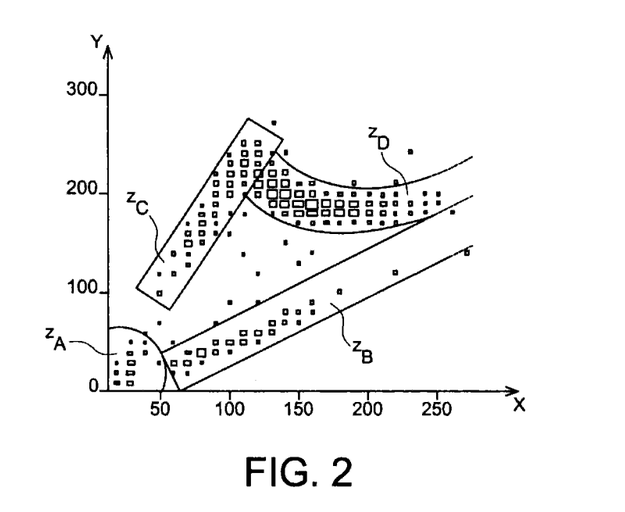
FIG. 2 is a two-dimensional graph illustrating radiation detection using a scintillator according to FIG. 1.

FIG. 2 is a two-dimensional graph illustrating particle detection using a scintillation detector using a scintillator according to FIG. 1.

The graph in FIG. 2 results from the implementation of a processing algorithm simultaneously integrating the electrons detected by the photomultiplier 3 in two different time windows, i.e. short time window (typically 10 ns) and a long time window (typically 40 ns). The data resulting from this integration are then quantified and recorded in a two-dimensional space (X,Y) where the x-axis X corresponds to the long time window and the y-axis Y to the short time window.

Four zones are then defined in the plane (X,Y), i.e. a zone $z_A$ corresponding to the alpha radiations, a zone $z_B$ corresponding to the gamma radiations and neutrons, a zone $z_C$ corresponding to the beta particles interacting solely in the upstream scintillator (plastic scintillator) and a zone $z_D$ corresponding to the beta particles interacting both in the upstream scintillator and the downstream scintillator (scintillator crystal).

It can be seen in FIG. 2 that the zones $z_C$ and $z_D$ are adjoined and that they have, as such, an overlap zone wherein it is not possible to clearly identify the source of the beta particles. This represents a drawback.

The invention does not have this drawback.

DESCRIPTION OF THE INVENTION

Indeed, the invention relates to a method for processing electrical signals from a phoswich scintillator comprising an upstream scintillator and a downstream scintillator, characterised in that it comprises, for each electrical signal:

- digitisation of the electrical signal,
- determination of an amplitude A and an integral surface area S of the digitised electrical signal,
- calculation of a first data item $S_1$ and a second data item $S_2$ using the following respective equations:

$$S_1 = [\tau_1/(\tau_2-\tau_1)][A(\tau_2/\tau_0)-S], \text{ and}$$

$$S_2 = [\tau_2/(\tau_2-\tau_1)][S-A(\tau_1/\tau_0)],$$

where:
- $\tau_1$ is a signal decay constant characteristic of particle detection in the upstream scintillator;
- $\tau_2$ is a signal decay constant characteristic of particle detection in the downstream scintillator;
- $\tau_0$ is an integration constant chosen for the measurement of the integral surface area S,
- display of the first and second data item $S_1$, $S_2$ in an orthonormal reference frame (S1, S2), the first data item $S_1$ being positioned along the axis S1 and the second data item $S_2$ being positioned along the axis S2 such that the first and second data items associated with the same electrical signal correspond to the same event,
- definition of a zone of interest of events by selecting, from the events distributed in the reference frame (S1, S2), events which are contained in the calibration zone defined following the detection of β particles during a preliminary calibration step.

According to an additional feature of the method according to the invention, the step for defining the zone of interest is followed by a step for counting the events in the zone of interest.

According to a further additional feature of the method according to the invention, a preliminary noise measurement corresponding to the detection of γ particles from the ambient noise gives rise to a noise event count in the calibration zone and the noise event count is subtracted from the events counted in the zone of interest.

The invention also relates to a scintillation detector comprising a phoswich scintillator and a processing circuit suitable for implementing the method for processing electrical signals according to the invention.

By means of the processing method according to the invention, the scintillation detector according to the invention advantageously detects β particles in mixed β, γ fields, in high γ atmospheres.

BRIEF DESCRIPTION OF THE FIGURES

Further features and advantages of the invention will emerge on reading a preferential embodiment, with reference to the figures attached, wherein.

In all the figures, the same references denote the same elements.

DETAILED DESCRIPTION OF A PREFERENTIAL EMBODIMENT OF THE INVENTION

Figure 3:
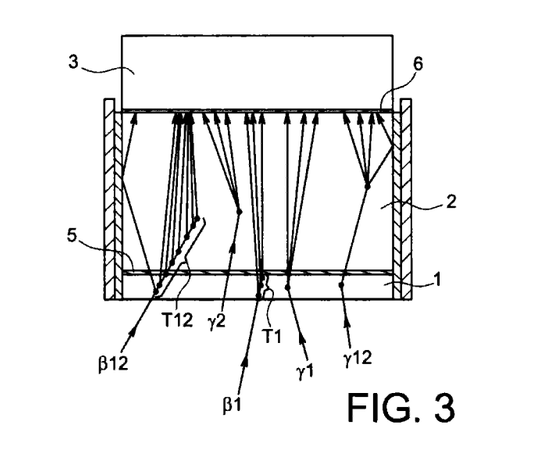
FIG. 3 illustrates, for instructive purposes, events producing scintillation photons in a phoswich scintillator.

FIG. 3 illustrates, for instructive purposes, for clearer comprehension of the invention, the events producing scintillation photons in a phoswich scintillator.

The incident particles producing scintillation photons suitable for reaching the photomultiplier are:

β particles interacting along a trajectory T12 situated in the upstream 1 and downstream 2 scintillators (referenced β12 in FIG. 3);

β particles interacting along a trajectory T1 situated only in the upstream scintillator 1 (referenced β1 in FIG. 3), photons γ1 only interacting in the upstream scintillator, photons β2 only interacting in the downstream scintillator, photons γ12 interacting first in the upstream scintillator, then in the downstream scintillator.

Particularly advantageously, these light photons produced by the interactions of the particles β12 are distinguished from the photons γ1 and γ2 by the scintillation detector according to the invention.

Figure 4:
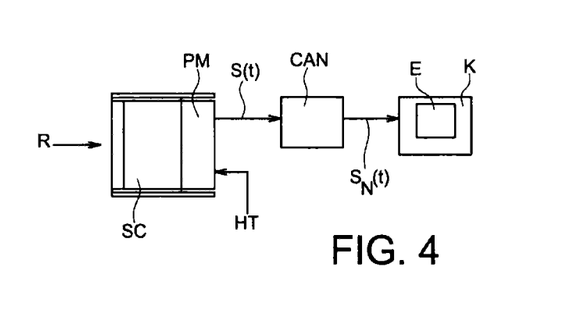
FIG. 4 represents a functional diagram of a scintillation detector according to the invention.

FIG. 4 represents a functional diagram of a scintillation detector according to the invention.

The scintillation detector comprises a scintillator SC equipped with a photomultiplier PM, a digital/analogue converter CAN and a computer K equipped with a display screen E. The scintillator SC is a phoswich scintillator comprising a plastic scintillator and a detector crystal. In a manner known per se, the photomultiplier PM is connected to a high voltage HT. The signal S(t) output by the photomultiplier PM is digitised by the analogue/digital converter CAN which outputs a digital signal $S_N(t)$. The digital signal $S_N(t)$ is processed, in the computer K, by the processing method according to the invention. The processing result is displayed, for example, on the display screen E.

Figure 5A:
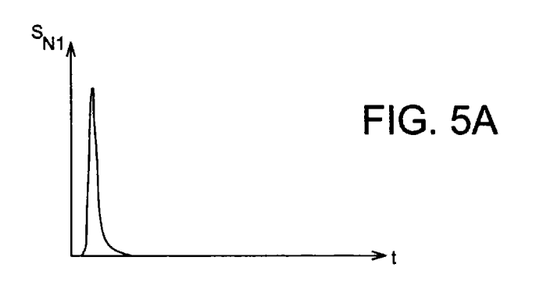
FIGS. 5A-5C represent examples of signals detected by the scintillation detector according to the invention.
Figure 5B:
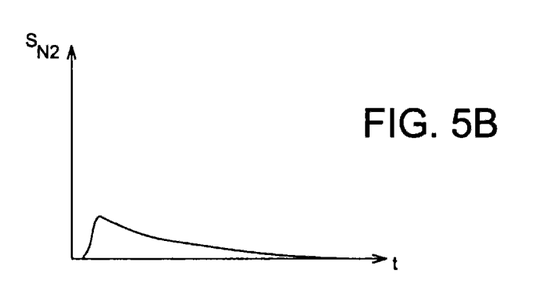
Figure 5C:
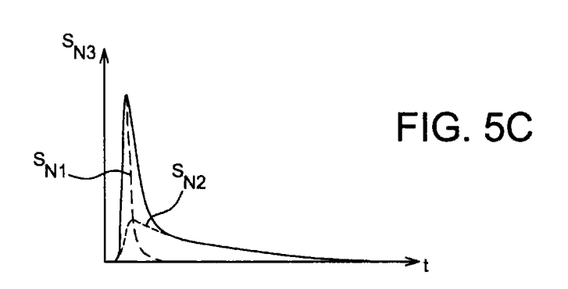

FIGS. 5A-5C represent the detection signal in three different scenarios:

FIG. 5A represents the digital signal $S_{N1}(t)$ resulting from the detection of a particle only in the upstream scintillator (with reference to FIG. 3, these are the particles γ1 and the particles β1 on the trajectory T1);

FIG. 5B represents the digital signal $S_{N2}(t)$ resulting from the detection of a particle only in the downstream scintillator (with reference to FIG. 3, these are the particles γ2);

FIG. 5C represents the digital signal $S_{N3}(t)$ resulting from the detection of a particle in the upstream scintillator and in the downstream scintillator (with reference to FIG. 3, these are the particles γ12 and particles β12).

The signal $S_{N1}(t)$ is short in duration. The signal $S_{N2}(t)$ is, compared to the signal $S_{N1}(t)$, long in duration. The signal $S_{N3}(t)$ is an overlay of signals $S_{N1}(t)$ and $S_{N2}(t)$. The time properties of these signals are linked with the intrinsic physical properties of the two scintillators forming the phoswich scintillator SC.

As already mentioned above, the light photons produced by the interactions of the particles β12 in the scintillator are to be distinguished from the set of light photons produced by the particles γ1, γ2, γ12 and β1.

Figure 6:
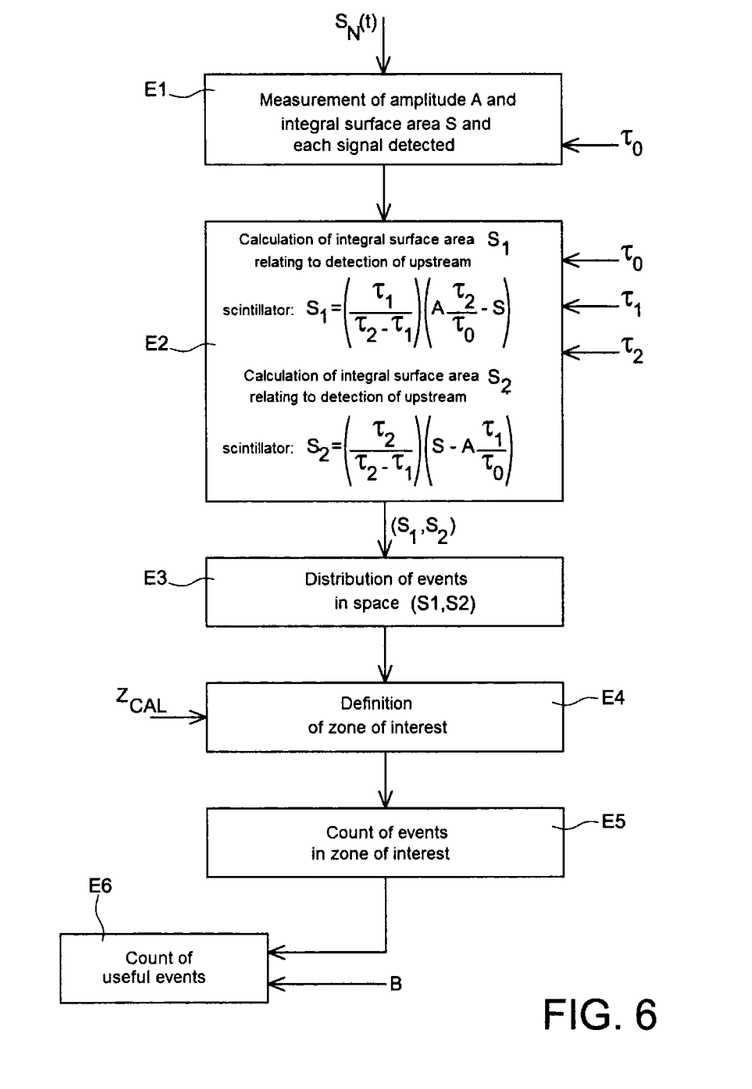
FIG. 6 represents a flow diagram of the processing algorithm according to the invention.

FIG. 6 illustrates the flow diagram of the processing algorithm according to the invention used for this purpose.

The processing algorithm firstly comprises a step E1 for measuring the amplitude A and the integral surface area S of each digital signal detected $S_N(t)$. The amplitude A is, by definition, the maximum value of the signal $S_N(t)$ and the integral surface area S is, by definition, the quantity such that:

$$S=(1/\tau_0)\int_o^t S_N(\tau)d\tau,$$

where $\tau_0$ is an integration constant determined, in a manner known per se, during a calibration step. The integration constant $\tau_0$ may be, for example, equal to 1.

The step E1 is followed by a calculation step E2, for each digital signal detected, of the data items $S_1$ and $S_2$ such that:

$$S_1=[\tau_1/(\tau_2-\tau_1)][A(\tau_2/\tau_0)-S], \text{ and}$$

$$S_2=[\tau_2/(\tau_2-\tau_1)][S-A(\tau_1/\tau_0)],$$

where:

$\tau_1$ is the decay constant of a signal from the detection of a particle in the upstream scintillator (known characteristic quantity of the upstream scintillator);

$\tau_2$ is the decay constant of a signal from the detection of a particle in the downstream scintillator (known characteristic quantity of the downstream scintillator);

$\tau_0$ is the integration constant mentioned above.

The step E2 is followed by a step E3 for distributing the events in the reference frame (S1, S2).

Figure 7:
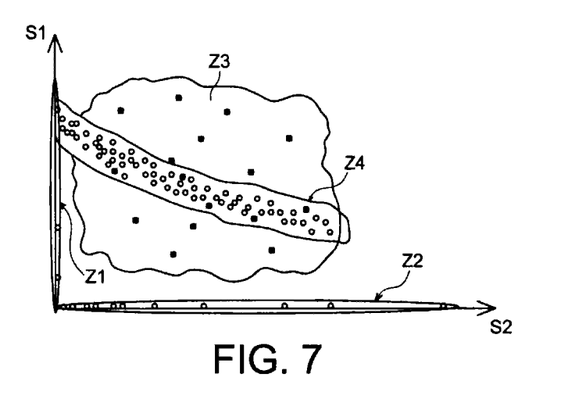
FIG. 7 represents, by way of example, a distribution of events in a two-dimensional space, obtained using the processing algorithm according to the invention represented in FIG. 6.

As a non-limiting example, FIG. 7 illustrates a distribution of the events in the reference frame (S1, S2). Four zones Z1-Z4 appear in FIG. 7. These four zones are advantageously suitable for performing the sought discrimination. Indeed:

the events associated with the particles γ1 and β1 define a zone Z1 which is positioned substantially along the axis S1;

the events associated with the particles γ2 define a zone Z2 which is positioned substantially along the axis S2;

the events associated with the particles γ12 define a zone Z3 which is distributed throughout the reference frame (S1, S2);

the events associated with the particles β12 define a zone Z4 which is distributed, in the reference frame (S1, S2), in the form of a band wherein one end is in contact with the axis S1.

The zone of interest is the zone Z4. Advantageously, it may be noted that the zone Z4 is clearly distinguished from the zone Z1, thus enabling very good discrimination between the particles β1 and β12. However, it should also be noted that the zone Z4 is mainly situated inside the zone Z3. It is thus necessary, on one hand, to clearly define the zone Z4 in relation to the zone Z3 and, on the other, to suppress the events from zone Z3 which are present in the zone Z4 (noise).

The step E3 for distributing the events in the reference frame (S1, S2) is thus followed by a step E4 for defining the zone Z4. The definition of the zone Z4 is performed by selecting, from the events distributed in the reference frame (S1, S2), events which are contained in a calibration zone $Z_{CAL}$ defined following the detection of β particles during a preliminary calibration step.

Figure 8:
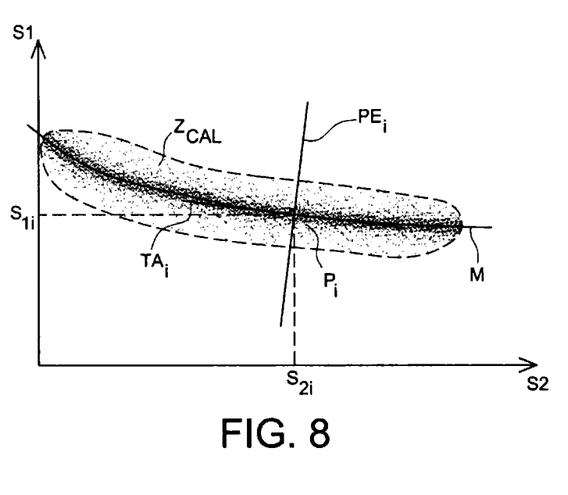
FIG. 8 illustrates obtaining calibration data involved in the implementation of the processing algorithm according to the invention.

FIG. 8 illustrates, as a non-limiting example, a determination of the calibration zone $Z_{CAL}$.

During the preliminary calibration step, the scintillation detector according to the invention (phoswich scintillator+ processing circuit implementing the method according to the invention) is used for detecting signals from pure β sources having different energies. The events detected are then distributed in the reference frame (S1, S2) on either side of a zone having a high concentration of events outlining a curve M. A number N of points $P_i$ on this curve M is then chosen, each point $P_i$ corresponding to a pair of data items $(S_{1i}, S_{2i})$. The number N chosen is sufficiently high so that the set of points Pi outlines a curve substantially representative of the curve M. For each point $P_i$ chosen, the tangent $TA_i$ to the curve M is then defined, followed by the line $PE_i$ which is perpendicular to the tangent $TA_i$ to the point $P_i$. The number of events situated on the line $PE_1$ decreases on either side of the point $P_i$. The two points defining the zone $Z_{CAL}$, on the line $PE_i$, on either side of the point $P_i$, are then chosen as being those for which the number of events is equal to x % of the number of events situated at the point $P_i$, for example 5%. This calculation is applied for each of the points $P_i$ and the calibration zone $Z_{CAL}$ is then deduced from the set of pairs of points obtained as specified above based on each point $P_i$.

The step E4 for defining the zone of interest is then followed by the step E5 for counting the events detected in the zone Z4. As is, the counting step E5 results in counting of useful events (detection of β12) and unnecessary events (detection of β12). According to the preferential embodiment of the invention, the unnecessary events are suppressed. For this purpose, during an additional calibration step, the noise events B which are associated with the detection of γ particles in the calibration zone $Z_{CAL}$ are counted. The step E5 for counting the set of events detected in the zone Z4 is then followed by a step E6 for determining only the useful events by subtracting the noise events B from the set of events counted following the step E5.

The method for processing signals according to the invention is particularly suitable for detecting signals from any type of phoswich scintillator. However, the known phoswich scintillator design mentioned above involves a drawback. Indeed, the optical cement binding the upstream and downstream scintillators represents a dead zone for particle detection, thus limiting the detection sensitivity.

Figure 9:
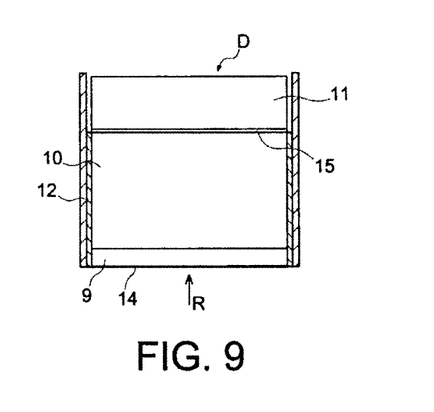
FIG. 9 represents a phoswich scintillator suitable for embodying a scintillation detector according to the preferential embodiment of the invention.

For this reason, the applicant also proposes, within the scope of the present invention, a scintillation detector wherein the phoswich scintillator does not comprise optical cement between the upstream and downstream scintillators. FIG. 9 illustrates a particularly advantageous example of this novel phoswich scintillator.

The phoswich scintillator represented in FIG. 9 comprises a first organic scintillator 9 and a second organic scintillator 10. A photodetector 11, for example a photomultiplier and a photodiode, is secured on the organic scintillator 10. As above, hereinafter in the description, the first scintillator is also referred to as the "upstream scintillator" and the second scintillator as the "downstream scintillator", with reference to the direction of propagation of incident particles on the detector. The first organic scintillator 9 has a thickness very substantially less than the thickness of the second organic scintillator 10. As a non-limiting example, the thickness of the first organic scintillator 9 is between 10 μm and 1 mm and the thickness of the second organic scintillator 10 is between 0.1 mm and 10 cm. The first and second organic scintillators are attached to each other by means of an autogenic coupling method. The second organic scintillator 10 and the photodetector 11 are attached to each other by an optical interface layer 15. The organic scintillators 9 and 10 are inserted in a light reflector 12. A thin conducting layer 14 coats the face of the organic scintillator 9 whereon the radiation R is incident.

More generally, the novel phoswich scintillator comprises a first scintillator and a second scintillator each consisting of a polymeric material and is characterised in that the first scintillator and the second scintillator are in direct contact with each other without the use of a bonding layer.

The term bonding layer denotes a distinct layer of the material of the first scintillator and the material of the second scintillator, this bonding layer being an attachment layer or a layer made of an intermediate material resulting from melting the material of the first scintillator and the material of the second scintillator, as is the case of scintillation detectors comprising two scintillators attached to each other by thermomechanical compression.

In structural terms, the first scintillator and the second scintillator may have a parallelepipedic shape or a cylindrical shape according to the requirements of the application in question.

If the scintillators have a parallelepipedic shape, the first scintillator and the second scintillator are, conventionally, in contact with each other, via one of the faces thereof, corresponding to the faces having the largest surface area and identical surface areas at the point of contact between the first scintillator and the second scintillator.

If the scintillators have a cylindrical shape, the first scintillator and the second scintillator are, conventionally, in contact with each other via the circular faces thereof, which have identical surface areas at the point of contact between the first scintillator and the second scintillator.

The first scintillator and the second scintillator may have different thicknesses, the thickness of the first scintillator optionally being less than that of the second scintillator.

For example, the first scintillator may have a thickness ranging from 10 μm to 1 mm, for example, from 50 μm to 1 mm, preferably from 100 μm to 500 μm, whereas the second scintillator may have a thickness ranging from 1 mm to several centimeters, for example 1 mm to 100 cm, preferably 1 to 4 cm.

As mentioned above, the first scintillator and the second scintillator are both made of a polymeric material.

In particular, the polymeric material of the first scintillator and the second scintillator may consist of a polymeric matrix, wherein one or a plurality of fluorescent molecules (which may also be referred to as fluorophores) are incorporated, which will make it possible to generate characteristic scintillation (i.e. light emission) of the absorption of a given radiation.

The incorporation of one or a plurality of fluorescent molecules may be performed either by dispersing one or a plurality of molecules in the polymeric matrix or by grafting one or a plurality of these molecules in the above-mentioned polymeric matrix.

In the latter case, the fluorescent molecule(s) are bound to the polymeric matrix by means of covalent bonds (the formation of this type of bond being suitable for being performed during the manufacture of the polymeric matrix by polymerisation, by incorporating one or a plurality of fluorescent molecules comprising at least one polymerisable function).

Whether for the first scintillator or the second scintillator, the polymeric matrix may consist of one or a plurality of polymers chosen so as not to affect the detection properties of the scintillator, the polymeric matrix optionally being identical for the first scintillator and the second scintillator.

In respect of the first scintillator, the polymeric matrix may comprise, in particular:
- a polymer comprising repeat units derived from the polymerisation of at least one styrene monomer, such as styrene;
- a polymer comprising repeat units derived from the polymerisation of at least one (meth)acrylate monomer;
- a polymer comprising siloxane type repeat units; and/or
- a cross-linked polymer comprising units derived from the polymerisation of at least one styrene monomer, at least one (meth)acrylate monomer and optionally at least one monomer comprising at least two polymerisable functions.

The term siloxane type repeat unit denotes a repeat unit comprising a —Si—O— group, the silicon atom being bound, in addition to an oxygen atom of said unit and to a further oxygen atom of the adjacent unit, with two further groups.

In particular, the polymers comprising siloxane type repeat units may have at least some of the repeat units mentioned above, wherein the silicon atom is bound with an aromatic group, such as a phenyl group. The presence of aromatic groups in the polymeric matrix helps enhance the energy transfer between the polymeric matrix and the fluorescent molecules.

The constituent polymers of the polymeric matrix comprising siloxane type repeat units may comprise repeat units complying with the following formula (I):

(I)

wherein $R^1$ represents an alkyl group comprising 1 to 10 carbon atoms, an aromatic hydrocarbon group comprising 5 to 10 carbon atoms (such as a phenyl group) or a hydrogen atom, and optionally repeat units complying with the following formula (II):

(II)

wherein $R^2$ and $R^3$, identical or different, represent an alkyl group comprising 1 to 10 carbon atoms, an aromatic hydrocarbon group comprising 5 to 10 carbon atoms (such as a phenyl group) or a hydrogen atom.

The polymers of the type mentioned above may be cross-linked polymers, i.e. polymers comprising polymeric chains bound together via a cross-linking bridge joining repeat units from separate chains.

In this case, such polymers, in addition to optionally the repeat units according to formulas (I) and (II) as mentioned above, may comprise repeat units according to the following formula (III):

(III)

wherein $R^4$ represents an alkyl group comprising 1 to 10 carbon atoms, an aromatic hydrocarbon group comprising 5 to 10 carbon atoms (such as a phenyl group) or a hydrogen atom, the bracket indicating the location where said unit is bound to another polymeric chain.

Polymers according to the definition given above may be polymers resulting from a hydrosilylation reaction of at least one siloxane compound complying at least with the one of the following formulas (IV) and (V):

(IV)

(V)

wherein:
$R^5$, $R^6$, $R^7$, $R^8$ and $R^9$ represent, independently of each other, an alkyl group comprising 1 to 10 carbon atoms, an aromatic hydrocarbon group comprising 5 to 10 carbon atoms, an alkenyl group comprising an end-of-chain unsaturation and comprising 2 to 10 carbon atoms; and n, m, $n_1$ and $m_1$ represent the number of repeats of the units between brackets, with at least one polysiloxane compound complying at least with one of the following formulas (VI) and (VII):

(VI)

(VII)

wherein:
R$^{10}$, R$^{11}$, R$^{12}$, R$^{13}$ and R$^{14}$ represent, independently of each other, an alkyl group comprising 1 to 10 carbon atoms, an aromatic hydrocarbon group comprising 5 to 10 carbon atoms (such as a phenyl group) or a hydrogen atom;

n$_2$, m$_2$, n$_3$ and m$_3$ represent the number of repeats of the unit between brackets.

Further details relating to this reaction will be given in the part relating to the method for preparing detectors according to the invention.

As examples of styrene monomers suitable for use for the polymeric matrix of the first scintillator, mention may be made of monomers according to the following formulas (VIII) and (IX):

(VIII)

(IX)

As examples of (meth)acrylate monomers, mention may be made of monomers according to the following formulas (X) and (XI):

(X)

(XI)

wherein R$^{15}$ represents an aromatic hydrocarbon group, such as an aryl group, an arylakyl group.

More specifically, R$^{15}$ may be a phenyl group, a benzyl group, a 1-naphthyl group or a 2-naphthyl group.

The polymeric matrix may be advantageously cross-linked, meaning that it consists of polymers comprising a plurality of polymeric chains bound together by cross-linking bridges.

These cross-linking bridges may be obtained by introducing, during the step for preparing the polymers by means of polymerisation, monomers bearing at least two polymerisable functions.

As examples of such monomers, mention may be made of alkyl di(meth)acrylates, such as alkyl di(meth)acrylates complying with the following formulas (XII) and (XIII):

(XII)

(XIII)

wherein x and y represent the number of repeats of the unit between brackets, x and y optionally being an integer ranging from 1 to 20, preferably from 2 to 6.

According to one particular embodiment, the polymeric matrix of the first scintillator may comprise a cross-linked polymer comprising repeat units derived from the polymerisation of at least one styrene monomer, at least one (meth)acrylate monomer and optionally at least one monomer comprising at least two polymerisable functions, such as di(meth)acrylate monomers, said di(meth)acrylate monomers being suitable for corresponding to those defined specifically above.

By way of example, the polymeric matrix of the first scintillator may comprise a polymer comprising repeat units derived from the polymerisation of at least one monomer chosen from styrene, vinyltoluene, phenyl methacrylate, benzyl methacrylate, 1-naphthyl methacrylate or 2-naphthyl methacrylate and at least one monomer bearing at least two ethylene functions chosen from alkyl di(meth)acrylates, such as those mentioned above.

More specifically, the polymeric matrix of the first scintillator may comprise a polymer comprising repeat units derived from the polymerisation of styrene, benzyl methacrylate and 1,6-hexanediyl dimethacrylate.

The fluorescent molecules suitable for being used in the composition of the first scintillator are advantageously fluorescent molecules characterised by a rapid decay time, i.e. a decay time ranging from 1 to 20 ns, preferably from 1 to 10 ns.

It may consist in particular of a mixture of a first fluorescent molecule and a second fluorescent molecule and optionally a third fluorescent molecule.

The first fluorescent molecule may be chosen so as to have an absorption spectrum, wherein the peak absorption intensity is situated between 250 and 350 nm (for example, this peak absorption intensity may be centred on 300 nm).

The second fluorescent molecule may be chosen so as to have an absorption spectrum suitable for covering the emission spectrum of the first fluorescent molecule (in particular to optimise the energy transfers between the two fluorescent molecules), meaning, in other words, that the second fluorescent molecule is suitable, on one hand, for absorbing photons having wavelengths belonging to the emission spectrum of said first fluorescent molecule, and, on the other, following this absorption, for emitting photons, such that the emission spectrum of said second fluorescent molecule ranges from 350 to 650 nm with a peak emission intensity between 400 and 600 nm.

If applicable, the third fluorescent molecule may be chosen so as to have an absorption spectrum suitable for covering the emission spectrum of the second fluorescent molecule (in particular to optimise the energy transfers between the two fluorescent molecules), meaning, in other words, that the third fluorescent molecule is suitable for absorbing photons having wavelengths belonging to the emission spectrum of said second fluorescent molecule, said third fluorescent molecule being suitable, following this absorption, for emitting photons, such that the emission spectrum of said third fluorescent molecule has a peak emission intensity between 500 and 600 nm.

A first fluorescent molecule of the type mentioned above may be a 2,5-diphenyloxazone compound, whereas a second fluorescent molecule of the type mentioned above may be a bis-methylstyrylbenzene compound (optionally called bis-MSB).

In respect of the second scintillator, the polymeric matrix may comprise, in particular:

- a polymer comprising repeat units derived from the polymerisation of at least one styrene monomer;
- a polymer comprising repeat units derived from the polymerisation of at least one (meth)acrylate monomer; and/or
- a cross-linked polymer comprising units derived from the polymerisation of at least one styrene monomer, at least one (meth)acrylate monomer and optionally at least one monomer comprising at least two polymerisable functions.

As examples of styrene monomers, mention may be made of monomers according to the following formulas (VIII) and (IX):

(VIII)

(IX)

As examples of (meth)acrylate monomers, mention may be made of monomers according to the following formulas (X) and (XI):

(X)

(XI)

wherein $R^{15}$ represents an aromatic hydrocarbon group, such as an aryl group, an arylakyl group.

More specifically, $R^{15}$ may be a phenyl group, a benzyl group, a 1-naphthyl group or a 2-naphthyl group.

The polymeric matrix is advantageously cross-linked, meaning that it consists of polymers comprising a plurality of polymeric chains bound together by cross-linking bridges.

These cross-linking bridges may be obtained by introducing, during the step for preparing the polymers by means of polymerisation, monomers bearing at least two polymerisable functions.

As examples of such monomers, mention may be made of alkyl di(meth)acrylates, such as alkyl di(meth)acrylates complying with the following formulas (XII) and (XIII):

(XII)

(XIII)

wherein x and y represent the number of repeats of the unit between brackets, x and y optionally being an integer ranging from 1 to 20, preferably from 2 to 6.

According to one particular embodiment of the invention, the polymeric matrix of the second scintillator may comprise a cross-linked polymer comprising repeat units derived from the polymerisation of at least one styrene monomer, at least one (meth)acrylate monomer and at least one monomer comprising at least two polymerisable functions, such as di(meth)acrylate monomers, said di(meth)acrylate monomers being suitable for corresponding to those defined specifically above.

By way of example, the polymeric matrix of the second scintillator may comprise a polymer comprising repeat units derived from the polymerisation of at least one monomer chosen from styrene, vinyltoluene, phenyl methacrylate, benzyl methacrylate, 1-naphthyl methacrylate or 2-naphthyl methacrylate and at least one monomer bearing at least two ethylene functions chosen from alkyl di(meth)acrylates, such as those mentioned above.

More specifically, the polymeric matrix of the second scintillator may comprise a polymer comprising repeat units derived from the polymerisation of styrene, benzyl methacrylate and 1,6-hexanediyl dimethacrylate.

The fluorescent molecules suitable for being used in the composition of the second scintillator are advantageously fluorescent molecules characterised by a long decay time, i.e. a decay time ranging from 20 to 500 ns, preferably from 50 to 200 ns, where this decay time is to be 4 to 50 times greater than the decay time of the fluorescent molecules of the first scintillator.

It may consist in particular of a mixture of a first fluorescent molecule and a second fluorescent molecule and optionally a third fluorescent molecule.

The first fluorescent molecule may be chosen so as to have an absorption spectrum, wherein the peak absorption intensity is situated between 250 and 350 nm (for example, this peak absorption intensity may be centred on 300 nm).

The second fluorescent molecule may be chosen so as to have an absorption spectrum suitable for covering the emission spectrum of the first fluorescent molecule (in particular to optimise the energy transfers between the two fluorescent molecules), meaning, in other words, that the second fluorescent molecule is suitable, on one hand, for absorbing photons having wavelengths belonging to the emission spectrum of said first fluorescent molecule, and, on the other, for emitting photons, such that the emission spectrum of said second fluorescent molecule ranges from 350 to 650 nm with a peak emission intensity between 400 and 500 nm.

If applicable, the third fluorescent molecule may be chosen so as to have an absorption spectrum suitable for covering the emission spectrum of the second fluorescent molecule (in particular to optimise the energy transfers between the two fluorescent molecules), meaning, in other words, that the third fluorescent molecule is suitable for absorbing photons having wavelengths belonging to the emission spectrum of said second fluorescent molecule, said third fluorescent molecule being suitable, following this absorption, for emitting photons, such that the emission spectrum of said third fluorescent molecule has a peak emission intensity between 500 and 600 nm.

A first fluorescent molecule of the type mentioned above may be a pyrene compound, whereas a second fluorescent molecule of the type mentioned above may be a 9,10-diphenylanthracene compound.

Besides the presence of a first scintillator and a second scintillator in contact with each other, the scintillation detectors according to the invention may comprise at the front face (i.e. the face opposite that in contact with the second scintillator) of the first scintillator an incident radiation entry window, this entry window optionally materialised in the form of a layer, for example an opaque layer (for example, an aluminium layer).

This entry window enables the incident radiation to come into contact with the first scintillator while preventing the ambient light from coming into contact with this first scintillator.

This entry window, when in the form of a layer, should be, preferably, as thin as possible, so as to degrade as little as possible the limit of detection of the scintillator detector. For example, it may have a thickness ranging from 10 nm to 5 µm.

Furthermore, at the rear face of the second scintillator (i.e. the face opposite the face of the second scintillator in contact with the first scintillator), an exit window may be provided consisting of a bonding layer so as make the connection between the second scintillator and a photomultiplier.

This bonding layer may be a layer made of a material chosen from greases, glues, gels, cements, elastomer compounds, silicone compounds.

Finally, on the lateral surface of the stack consisting of the first scintillator and the second scintillator, a layer of reflective material may be provided, this reflective material optionally comprising aluminium (for example, aluminised mylar or aluminium foil) or a layer of a diffusing material, this diffusing material optionally comprising Teflon, a paint based on titanium oxide $TiO_2$, a paint based on magnesium MgO, Millipore filter paper.

The method for manufacturing the scintillation detector according to the preferential embodiment of the invention comprises a step for producing the first or second scintillator on a substrate, said substrate corresponding to the scintillator forming the detector (in this instance, the first scintillator if the production step relates to the second scintillator and conversely).

The step for producing the first or second scintillator may be performed by polymerising a polymerisation medium comprising monomers or oligomers intended to be used in the composition of the first scintillator or second scintillator. This polymerisation medium further comprises the fluorescent molecule(s) intended to be used in the first scintillator or second scintillator.

The method may comprise, before the step for producing a scintillator (first or second) on the substrate, the step for producing the other scintillator forming said substrate.

This production step may be performed by polymerising a polymerisation medium, further comprising the fluorescent molecule(s) intended to be used in the composition of said scintillator.

The fluorescent molecule(s) may comprise at least one polymerisable function, in which case they will be, following polymerisation, grafted directly by means of covalence in the polymeric matrix.

It is understood that these production steps will be performed in moulds of suitable shapes such that the end product has the shape sought for the first and second scintillators.

According to a first embodiment, when preparing the first scintillator, the polymerisation medium may comprise:
  at least one styrene monomer as mentioned above in the optional presence of at least one (meth)acrylate monomer and/or at least one monomer comprising at least two polymerisable functions;
  polymerisation initiators;
  fluorescent molecules.

The polymerisation initiators, if necessary, may be a peroxide compound, such as benzoyl peroxide, or a nitrile compound, such as azo(bis)isobutyronitrile. These polymerisation initiators may be included, in the polymerisation medium, at molar percentages between 0.01 and 2%, preferably, a percentage of 0.5%.

When the polymerisation reaction is performed in the presence of methacrylate monomers, the polymerisation may be induced thermally by heating the polymerisation medium at a suitable temperature, or by doping the polymerisation medium with 2,2-dimethoxy-2-phenylacetophenone followed by irradiation under UV (for example, at a wavelength of 355 nm). The molar concentration of 2,2-dimethoxy-2- phenylacetophenone may be between 0.1 and 2%. Preferentially, the molar concentration used may be between 0.5 and 1%.

When the polymerisation reaction is performed in the presence of styrene monomers, the polymerisation may be induced thermally.

The proportion by volume of the styrene or methacrylate monomers in relation to the monomers comprising at least two polymerisable functions in the reaction mixture may be between 99/1 and 60/40. Preferentially, this proportion by volume may be between 90/10 and 50/50.

According to a second embodiment, when preparing the first scintillator, the polymerisation medium may comprise:
a polysiloxane compound complying with at least one of the following formulas (IV) and (V):

wherein:
$R^5$, $R^6$, $R^7$, $R^8$ and $R^9$ represent, independently of each other, an alkyl group comprising 1 to 10 carbon atoms, an aromatic hydrocarbon group comprising 5 to 10 carbon atoms, an alkenyl group comprising an end-of-chain unsaturation and comprising 2 to 10 carbon atoms; and
n, m, $n_1$ and $m_1$ represent the number of repeats of the units between brackets;
a polysiloxane compound complying with at least one of the following formulas (VI) and (VII):

wherein:
$R^{10}$, $R^{11}$, $R^{12}$, $R^{13}$ and $R^{14}$ represent, independently of each other, an alkyl group comprising an alkyl group comprising 1 to 10 carbon atoms, an aromatic hydrocarbon group comprising 5 to 10 carbon atoms (such as a phenyl group) or a hydrogen atom;
$n_2$, $m_2$, $n_3$ and $m_3$ represent the number of repeats of the unit between brackets.
a hydrosilylation catalyst; and
fluorescent molecules.

Apart from the use of pure compounds, all the molar fractions between the compounds (IV) or (V) and the compounds (VI) or (VII) may be used, i.e. 99% to 1% and 1% to 99%.

If required, the reaction between the compounds (IV) or (V) and the compounds (VI) or (VII) may be facilitated thermally. Preferentially, the reactions are performed between 30° C. and 50° C.

The hydrosilylation catalyst is a platinum catalyst known in hydrosilylation reactions. More particularly, Karstedt's catalyst or cis-bis(diethylsulphato)-dichloroplatinum (II) may be used at molar concentrations between 0.01% and 3%.

Whether for the first embodiment or the second embodiment or for further embodiments, the fluorescent molecules may comprise at least one polymerisable function, in which case they will be, following polymerisation, grafted directly by means of covalence, in the polymeric matrix, such molecules optionally being p-vinylbiphenyl or vinylnaphthalene.

When preparing the second scintillator, the polymerisation medium may comprise:
at least one styrene monomer as mentioned above in the optional presence of at least one (meth)acrylate monomer and/or at least one monomer comprising at least two polymerisable functions; and
fluorescent molecules.

When the polymerisation reaction is performed in the presence of methacrylate monomers, the polymerisation may be induced thermally by heating the polymerisation medium at a suitable temperature, or by doping the polymerisation medium with 2,2-dimethoxy-2-phenylacetophenone followed by irradiation under UV (for example, at a wavelength of 355 nm). The molar concentration of 2,2-dimethoxy-2-phenylacetophenone may be between 0.1 and 2%. Preferentially, the molar concentration used may be between 0.5 and 1%.

When the polymerisation reaction is performed in the presence of styrene monomers, the polymerisation may be induced thermally.

The proportion by volume of the styrene or methacrylate monomers in relation to the monomers comprising at least two polymerisable functions in the reaction mixture may be between 99/1 and 60/40. Preferentially, this proportion by volume may be between 90/10 and 50/50.

The fluorescent molecule(s) may comprise at least one polymerisable function, in which case they will be, following polymerisation, grafted directly by means of covalence, in the polymeric matrix, these fluorescent molecules optionally being pyrenyl (meth)acrylamide or pyrenyl (meth)acrylate.

Once the first scintillator and the second scintillator have been produced, the production of an entry window as mentioned above, the coupling of the second scintillator with a photomultiplier and a lateral coating intended to cover the lateral surface of the stack consisting of the first scintillator and the second scintillator may be performed.

The entry window may be produced by depositing on the front face of the first scintillator (i.e. the face opposite the face in contact with the second scintillator) a metal layer, the deposition technique suitable for being used being vacuum thermal evaporation, vacuum electron beam evaporation, vacuum cathode sputtering, electroplating, with, preferentially, vacuum thermal evaporation.

The coupling of the second scintillator with a photomultiplier may be performed by inserting a bonding layer between said second scintillator and the photomultiplier.

Before inserting this bonding layer, the rear face of the downstream scintillator (i.e. the face opposite that in contact with the upstream scintillator) may be polished to obtain a suitable surface condition suitable for light transfer from the downstream scintillator to the photodetector.

The bonding layer may be an optical layer, i.e. a layer, that allows the radiation from the downstream scintillator to pass through, this layer optionally being made of a material chosen from greases, glues, gels, cements, elastomer compounds and silicone compounds.

The lateral coating may be produced by depositing on the lateral surface of the stack of the first and second scintillators of a material suitable for reflecting or diffusing light. It may consist, for example, of aluminised mylar or aluminium foil to produce a reflective material or Teflon tape, a paint based on $TiO_2$, based on MgO, Millipore filter paper to produce a diffusing material, a paint based on $TiO_2$ being preferentially used.

The scintillation detectors according to the invention are versatile detectors, which by means of the choice of constituent materials of the first scintillator and the second scintillator enable discrimination between a plurality of types of ionising radiation, for example, between electrons and photons (having an energy>1 keV).

The synthesis of the various constituent elements of the phoswich scintillator is described below.
Synthesis of the First Scintillator Styrene, benzyl methacrylate, 1,6-hexanediyl dimethacrylate, 2,5-diphenyloxazole and bis-MSB are mixed in an inert atmosphere in a dry flask.

The mixture is freed of any gas using the cold vacuum degassing method (known as the "freeze-pump-thaw" method), and it is poured carefully into a Teflon mould prepared to produce the final morphology of the scintillator to be obtained. The mixture placed in the mould is heated to 60° C. for 7 to 10 days.

The resulting product is then released from the mould and polished on one of the two larger sides to obtain a surface condition optically compatible with the sought applications.
Synthesis of the Second Scintillator Styrene, benzyl methacrylate, 1,6-hexanediyl dimethacrylate, pyrene and 9,10-diphenylanthracene are mixed in an inert atmosphere in a dry flask.

The mixture is freed of any gas using the cold vacuum degassing method (known as the "freeze-pump-thaw" method), and it is poured carefully into a Teflon mould prepared to produce the final morphology of the scintillator to be obtained. The mixture placed in the mould is heated to 60° C. for 7 to 10 days.

The resulting product is then released from the mould and polished on one of the two larger sides to obtain a surface condition optically compatible with the sought applications.
Production of the Entry Window The metal coating of the scintillators may be performed by means of vacuum thermal evaporation. The principle of this technique consists of heating in a crucible traversed by an electric current (Joule effect) the material to be deposited. The deposition is performed in a vacuum chamber. The vaporised material is condensed on the substrate (scintillator) placed above the crucible.

The choice of crucible depends on the material to be evaporated. In the case of aluminium deposition, a tungsten crucible may be used, the melting point of this crucible being greater than the evaporating temperature of aluminium.

The thickness of the layers and the deposition rate is checked using a quartz balance.

For scintillators having a large area, a system for rotating the substrate suitable for moving the scintillator during evaporation may be used to enhance the homogeneity of the layers deposited (variation of thickness of deposited layer).
Production of the Exit Window This consists of coating the surface of the scintillator with a thin layer of optical grease to enable contact with the photodetection cell.

The invention claimed is:

1. A method for processing electrical signals from a phoswich scintillator including an upstream scintillator and a downstream scintillator, the method comprising, for each electrical signal:
    digitization of the electrical signal;
    determination of an amplitude A and an integral surface area S of the digitized electrical signal;
    calculation of a first data item $S_1$ and a second data item $S_2$ using following respective equations:

$$S_1=[\tau_1/(\tau_2-\tau_1)][A(\tau_2/\tau_0)-S], \text{ and}$$

$$S_2=[\tau_2/(\tau_2-\tau_1)][S-A(\tau_1\tau_0)],$$

in which:
    $\tau_1$ is a signal decay constant characteristic of particle detection in the upstream scintillator;
    $\tau_2$ is a signal decay constant characteristic of particle detection in the downstream scintillator;
    $\tau_0$ is an integration constant chosen for the measurement of the integral surface area S;
    display of the first and second data item $S_1$, $S_2$ in an orthonormal reference frame, the first data item $S_1$ being positioned along an axis S1 and the second data item $S_2$ being positioned along an axis S2 such that the first and second data items associated with a same electrical signal correspond to a same event; and
    definition of a zone of interest of events by selecting, from the events distributed in the reference frame, events that are contained in a calibration zone defined following the detection of β particles during a preliminary calibration.

2. A method according to claim 1, wherein the definition of the zone of interest is followed by a counting of the events in the zone of interest.

3. A method according to claim 2, wherein a preliminary noise measurement corresponding to detection of γ particles from ambient noise gives rise to a noise event count in the calibration zone and the noise event count is subtracted from the events counted in the zone of interest.

4. A scintillation detector comprising a phoswich scintillator and a processing circuit configured to implement the method for processing electrical signals according to claim 1.

5. A detector according to claim 4, wherein the phoswich scintillator comprises a first scintillator and a second scintillator each comprising a polymeric material, the first scintillator and the second scintillator are in direct contact with each other without use of a bonding layer.

6. A detector according to claim 5, wherein the first scintillator is an upstream scintillator and the second scintillator a downstream scintillator with reference to a direction of propagation of particles detected by the detector.

7. A detector according to claim 5, wherein the first scintillator and the second scintillator have a parallelepipedic shape or a cylindrical shape.

8. A detector according to claim 5, wherein the polymeric material comprises a polymeric matrix, wherein one or a plurality of fluorescent molecules are dispersed, which make it possible to generate characteristic scintillation of an absorption of a given radiation.

9. A detector according to claim 8, wherein the polymeric matrix of the first scintillator comprises:
- a polymer comprising repeat units comprising repeat units derived from polymerization of at least one styrene monomer;
- a polymer comprising repeat units derived from the polymerization of at least one (meth)acrylate monomer;
- a polymer comprising siloxane type repeat units; and/or
- a cross-linked polymer comprising units derived from the polymerization of at least one styrene monomer, at least one (meth)acrylate monomer and optionally at least one monomer comprising at least two polymerizable functions.

10. A detector according to claim 9, wherein the polymers comprising siloxane type repeat units comprise at least some of the repeat units having a silicon atom bound with an aromatic group.

11. A detector according to claim 10, wherein the polymers are cross-linked polymers.

12. A detector according to claim 11, wherein the polymers comprise repeat units according to the following formula (III):

(III)

wherein $R^4$ represents an alkyl group comprising 1 to 10 carbon atoms, an aromatic hydrocarbon group comprising 5 to 10 carbon atoms or a hydrogen atom.

13. A detector according to claim 9, wherein the polymers comprising siloxane type repeat units comprise units complying with the following formula (I):

(I)

wherein $R^1$ represents an alkyl group comprising 1 to 10 carbon atoms, an aromatic hydrocarbon group comprising 5 to 10 carbon atoms or a hydrogen atom and optionally repeat units complying with the following formula (II):

(II)

wherein $R^2$ and $R^3$, identical or different, represent an alkyl group comprising 1 to 10 carbon atoms, an aromatic hydrocarbon group comprising 5 to 10 carbon atoms or a hydrogen atom.

14. A detector according to claim 9, wherein the (meth)acrylate monomer complies with any of the following formulas (X) and (XI):

(X)

(XI)

wherein $R^{15}$ represents an aromatic hydrocarbon group.

15. A detector according to claim 9, wherein the monomer comprising at least two polymerizable functions is an alkyl di(meth)acrylate complying with any of the following formulas (XII) and (XIII):

(XII)

(XIII)

wherein x and y represent the number of repeats of the unit between brackets, x and y optionally being an integer ranging from 1 to 20.

16. A detector according to claim 9, wherein the polymeric matrix of the first scintillator comprises a cross-linked polymer comprising repeat units derived from the polymerization of at least one monomer chosen from styrene, vinyltoluene, phenyl methacrylate, benzyl methacrylate, 1-naphthyl methacrylate or 2-naphthyl methacrylate and at least one monomer bearing at least two ethylene functions chosen from alkyl di(meth)acrylates.

17. A detector according to claim 16, wherein the polymeric matrix of the first scintillator comprises a polymer comprising repeat units derived from the polymerization of styrene, benzyl methacrylate and 1,6-hexanediyl dimethacrylate.

18. A detector according to claim 8, wherein the fluorescent molecules used in the composition of the first scintillator have a decay time ranging from 1 to 20 ns, or from 1 to 10 ns.

19. A detector according to claim 18, wherein the fluorescent molecules consist of a first fluorescent molecule and a second fluorescent molecule.

20. A detector according to claim 19, wherein the first fluorescent molecule is chosen so as to have an absorption spectrum, wherein peak absorption intensity is situated between 250 and 350 nm.

21. A detector according to claim 19, wherein the second fluorescent molecule is chosen to have an absorption spectrum suitable for covering an emission spectrum of the first fluorescent molecule, such that the second fluorescent molecule is suitable for absorbing photons having wavelengths belonging to the emission spectrum of the first fluorescent molecule, and following this absorption, for emitting photons, such that an emission spectrum of the second fluorescent molecule ranges from 350 to 650 nm with a peak emission intensity between 400 and 600 nm.

22. A detector according to claim 19, wherein the first fluorescent molecule is a 2,5-diphenyloxazone compound, whereas the second fluorescent molecule is a bis-methylstyrylbenzene compound.

23. A detector according to claim 8, wherein the polymeric matrix of the second scintillator comprises:
a polymer comprising repeat units derived from the polymerization of at least one styrene monomer;
a polymer comprising repeat units derived from the polymerization of at least one (meth)acrylate monomer; and/or
a cross-linked polymer comprising units derived from the polymerization of at least one styrene monomer, at least one (meth)acrylate monomer and optionally at least one monomer comprising at least two polymerizable functions.

24. A detector according to claim 23, wherein the (meth)acrylate monomer complies with any of the following formulas (X) and (XI):

(X)

(XI)

wherein $R^{15}$ represents an aromatic hydrocarbon group.

25. A detector according to claim 23, wherein the monomer comprising at least two polymerizable functions is an alkyl di(meth)acrylate complying with any of the following formulas (XII) and (XIII):

(XII)

(XIII)

wherein x and y represent the number of repeats of the unit between brackets, x and y optionally being an integer ranging from 1 to 20.

26. A detector according to claim 23, wherein the polymeric matrix of the second scintillator comprises a polymer comprising repeat units derived from the polymerization of at least one monomer chosen from styrene, vinyltoluene, phenyl methacrylate, benzyl methacrylate, 1-naphthyl methacrylate or 2-naphthyl methacrylate and at least one monomer bearing at least two ethylene functions chosen from alkyl di(meth) acrylates.

27. A detector according to claim 26, wherein the polymeric matrix of the second scintillator comprises a polymer comprising repeat units derived from the polymerization of styrene, benzyl methacrylate and 1,6-hexanediyl dimethacrylate.

28. A detector according to claim 8, wherein the fluorescent molecules used in the composition of the second scintillator have a decay time ranging from 20 to 500 ns.

29. A detector according to claim 28, wherein the fluorescent molecules consist of a mixture of a first fluorescent molecule and a second fluorescent molecule.

30. A detector according to claim 29, wherein the first fluorescent molecule is chosen to have an absorption spectrum, wherein peak absorption intensity is situated between 250 and 350 nm.

31. A detector according to claim 29, wherein the second fluorescent molecule is chosen to have an absorption spectrum suitable for covering an emission spectrum of the first fluorescent molecule, such that the second fluorescent molecule is suitable for absorbing photons having wavelengths belonging to the emission spectrum of the first fluorescent molecule, and for emitting photons, such that an emission spectrum of the second fluorescent molecule ranges from 350 to 650 nm with a peak emission intensity between 400 and 500 nm.

32. A detector according to claim 29, wherein the first fluorescent molecule is a pyrene compound, whereas the second fluorescent molecule is a 9,10-diphenylanthracene compound.

* * * * *